C. E. CRIPE.
FISH HOOK.
APPLICATION FILED MAR. 19, 1914.

1,116,025.

Patented Nov. 3, 1914.

Witnesses:
Irving B. Eames.
Lela W. Cooke.

Charles E. Cripe.
INVENTOR.
By George J. Oltsch.
ATTORNEY.

UNITED STATES PATENT OFFICE.

CHARLES E. CRIPE, OF SOUTH BEND, INDIANA.

FISH-HOOK.

1,116,025.         Specification of Letters Patent.         Patented Nov. 3, 1914.

Application filed March 19, 1914. Serial No. 825,734.

*To all whom it may concern:*

Be it known that I, CHARLES E. CRIPE, a citizen of the United States, residing at South Bend, in the county of St. Joseph and State of Indiana, have invented certain new and useful Improvements in Fish-Hooks, of which the following is a specification.

The invention relates to an improvement in artificial bait and particularly to a spinner constructed primarily with a view to providing a novel and effective form of spinner proper, and the utilization of such spinner as a weed guard.

The improvement essentially contemplates a spinner element arranged for coöperation with the shank of the hook and constructed of a single sheet of material formed to provide a cone-like body, and blades projecting from the rear marginal edge thereof, the cone-shaped body being utilized in part to house the weight and thereby act as a weed guard.

The invention in the preferred form of details will be described in the following specification, reference being had particularly to the accompanying drawings, in which:—

Figure 1:
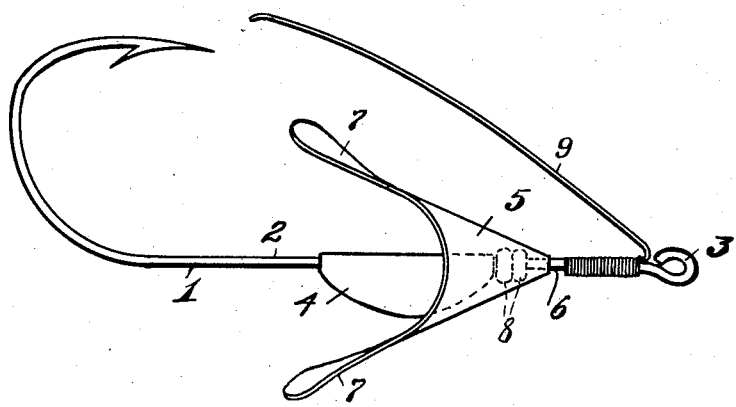
Figure 2:
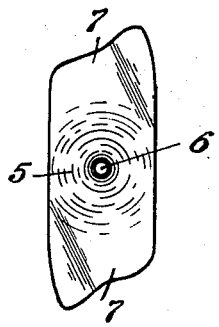

Figure 1 is a view in elevation of the improved spinner. Fig. 2 is a plan of the spinning element proper.

In constructing the improved lure, I utilize a hook 1 of ordinary type, having a shank 2 of appropriate length and terminating in an eye 3. Secured upon the shank 2, at an appropriate distance from the eye 3, is a weight 4, the weight being utilized for the well-understood purpose of maintaining the hook submerged in operation, and aside from this function, I contemplate the use of a weight of any desired outline.

The spinning element proper is constructed of a single sheet of material, preferably thin, and brightened in any usual or preferred manner to impart the desired sheen when in action. The spinning element is formed to provide a cone-shaped body 5, formed at the apex with an opening 6 to loosely receive the shank 2 of the hook. In base plan, the marginal edge of the body is approximately of rectangular outline, and the diagonally opposed points thereof are extended rearwardly in the form of blades 7 which are of the usual compound curvature to impart a rotative action to the spinning element in the forward movement of the hook through the water.

Anti-friction rotative elements 8, in the form of disks of appropriate material, loosely encircle the shank 2 intermediate the weight and the spinning element, so that the latter is free to rotate under a comparatively slight forward movement of the hook.

A guard 9 is secured to the shank immediately adjacent the eye 3, the guard extending rearwardly to a point slightly forward of the hook terminal proper.

A particularly important feature of the present invention is the utilization of the spinning element as a weed guard for the weight, it being noted that the cone-shaped body overlies and forms an effective protector for the forward end of the weight. By this means, the spinner proper is maintained effective under all ordinary conditions, as the accumulation of weeds and refuse about the weight would choke or retard the action of the spinning element, and hence defeat the purpose of the lure. Furthermore, the spinning element proper is of novel form, as by the edge outline of the base I am enabled to avoid retarding the movement of the spinner in those edges intermediate the blades, as will be apparent from Fig. 2 of the drawings. Also the taper of the spinner in a direct line to a point in close contact with the hook-shank eliminates all angular and blunt weed catching formations. I thus not only provide a weedless spinner, but the same also serves as a weed guard for the weight and the anti-friction elements by forming a housing for the same.

What is claimed is:—

1. An artificial lure including a hook having a shank, a weight secured to the shank, and a spinning element mounted on the shank including a cone shaped body tapering forwardly to a point in immediate contact with the shank and propeller shaped blades extending rearwardly from the cone over the weight, whereby the spinning element presents a continuous tapering surface obviating weed catching formations in the forward movement of the lure and to serve as a weed guard for the weight.

2. An artificial lure including a hook having a shank, a weight secured to the shank, a spinning element mounted on the shank including a cone shaped body tapering forwardly to a point in close contact with the hook-shank, and propeller shaped blades projecting rearwardly from the cone over the weight and anti-friction means interposed between the spinning element and the weight, said spinning element forming a weed guard for the anti-friction means and the weight and by its unbroken tapering surface obviating all weed catching formations to provide a weedless spinner.

In testimony whereof I affix my signature in presence of two witnesses.

CHARLES E. CRIPE.

Witnesses:
    L. W. COOK,
    GEORGE J. OLTSCH.